United States Patent
Park et al.

(10) Patent No.: US 7,518,686 B2
(45) Date of Patent: Apr. 14, 2009

(54) LIQUID CRYSTAL DISPLAY

(75) Inventors: Dong-Jin Park, Seoul (KR); Tae-Hyeog Jung, Seoul (KR); Hae-Jin Heo, Seoul (KR)

(73) Assignee: Samsung Mobile Display Co., Ltd., Suwon-si (KR)

( * ) Notice: Subject to any disclaimer, the term of this patent is extended or adjusted under 35 U.S.C. 154(b) by 174 days.

(21) Appl. No.: 10/916,666

(22) Filed: Aug. 11, 2004

(65) Prior Publication Data

US 2005/0088582 A1 Apr. 28, 2005

(30) Foreign Application Priority Data

Oct. 28, 2003 (KR) .................. 10-2003-0075661

(51) Int. Cl.
*G02F 1/1343* (2006.01)
(52) U.S. Cl. ...................... 349/139; 349/110
(58) Field of Classification Search ................. 349/139, 349/143, 43, 65, 141, 123, 110, 42, 106, 349/38
See application file for complete search history.

(56) References Cited

U.S. PATENT DOCUMENTS

| | | | |
|---|---|---|---|
| 5,852,485 A * | 12/1998 | Shimada et al. | 349/141 |
| 6,219,113 B1 * | 4/2001 | Takahara | 349/42 |
| 6,486,933 B1 | 11/2002 | Cha et al. | |
| 6,962,429 B2 * | 11/2005 | Yamamoto | 362/614 |

FOREIGN PATENT DOCUMENTS

| | | |
|---|---|---|
| CN | 1296194 | 5/2001 |
| JP | 2-3022 | 1/1990 |
| JP | 5-107555 | 4/1993 |
| JP | 5-323370 | 12/1993 |
| JP | 6-118447 | 4/1994 |
| JP | 6-281959 | 10/1994 |
| JP | 2001-318391 | 11/2001 |
| JP | 2001-343666 | 12/2001 |
| JP | 2003-295833 | 10/2003 |
| KR | 1999-010077 | 2/1999 |
| KR | 2002-0048822 | 6/2002 |

OTHER PUBLICATIONS

English translation abstract for KR10-1999-0010077 publication dated Feb. 5, 1999.
Korean Patent Abstract for publication 1020020048822 A dated Jun. 24, 2002.

(Continued)

*Primary Examiner*—Thoi V Duong
(74) *Attorney, Agent, or Firm*—Christie, Parker & Hale, LLP

(57) ABSTRACT

A liquid crystal display having suppression of horizontal crosstalk. A liquid crystal display includes a lower substrate and a plurality of data lines arranged on the lower substrate. The liquid crystal display also includes an upper substrate positioned above the lower substrate and has an opposite surface facing the lower substrate. Stripe shaped common electrodes spaced apart from each other by a plurality of regions are formed on the opposite surface of the upper substrate. Each of the plurality of regions corresponds to one of the data lines of the lower substrate.

20 Claims, 4 Drawing Sheets

OTHER PUBLICATIONS

Korean Office action dated Aug. 22, 2005 corresponding to Korean Patent Application 10-2003-0075666l.
China Office action dated Sep. 8, 2006 with English translation.
Patent Abstract of Japan, Publication No. 02-003022, dated Jan. 8, 1990, in the name of Atsushi Inoue et al.
Patent Abstracts of Japan, Publication No. 05-107555, dated Apr. 30, 1993, in the name of Tomoko Kitazawa.
Patent Abstracts of Japan, Publication No. 05-323370, dated Dec. 7, 1993, in the name of Yoneji Takubo et al.
Patent Abstracts of Japan, Publication No. 06-281959, dated Oct. 7, 1994, in the name of Kanbara Minoru.
Patent Abstracts of Japan, Publication No. 2001-318391, Nov. 16, 2001, in the name of Koji Kikuchi.
Patent Abstracts of Japan, Publication No. 2001-343666, Dec. 14, 2001, in the name of Hisashi Nagata et al.
Patent Abstracts of Japan, Publication No. 06-118447, dated Apr. 28, 1994, in the name of Akihiro Sato.
Patent Abstracts of Japan, Publication No. 2003-295833, dated Oct. 15, 2003, in the name of Yoshio Shirakawa et al.

* cited by examiner

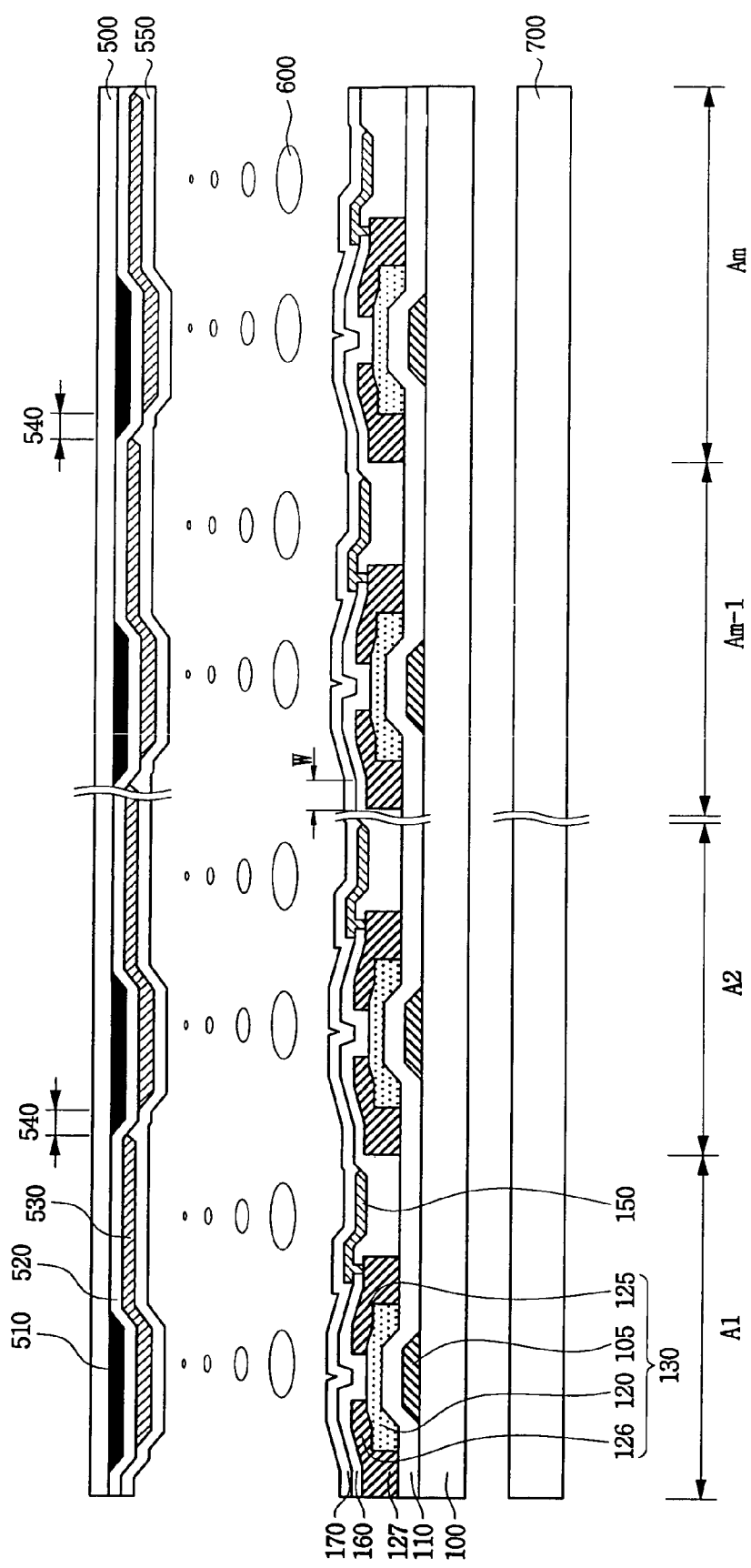

LIQUID CRYSTAL DISPLAY

CROSS REFERENCE TO RELATED APPLICATIONS

This application claims priority to and the benefit of Korean Patent Application No. 2003-75661, filed on Oct. 28, 2003 in the Korean Intellectual Property Office, the disclosure of which is incorporated herein by reference in its entirety.

BACKGROUND OF THE INVENTION

1. Field of the Invention

The present invention relates to a liquid crystal display, and more particularly, to a liquid crystal display with a patterned common electrode.

2. Description of Related Art

A thin film transistor liquid crystal display (hereinafter referred to as "TFT LCD") is being widely used because it has a number of beneficial characteristics including a large contrast ratio, suitability for realizing gray scale or moving pictures, and a capability to easily realize full colors.

As the display size of the TFT LCD and its resolution increase, however, deterioration of images due to such phenomena as crosstalk, flicker and residual image are becoming increasingly problematic. The crosstalk refers to the phenomenon through which a gray level different from a predetermined gray level is displayed at peripheral regions positioned above and below or left and right of a region A when white or black is displayed at the region A. It is because the peripheral regions are influenced by the white or black of the region A. A vertical crosstalk is the crosstalk generated at the peripheral regions positioned above and below the region A, and a horizontal crosstalk is the crosstalk generated at the peripheral regions positioned to the left and right of the region A.

FIG. 1 is a plan view of a screen of a conventional normally white type liquid crystal display on which horizontal crosstalk has been generated. In FIG. 1, a screen having windows W11 to W33 arranged in a matrix configuration is illustrated.

To display "black" on the window W22 and "gray" on peripheral windows W11 to W13, W21, W23 and W31 to W33, first the scan lines of the windows W11, W12 and W13 are selected, and a first voltage is equally applied to the data lines of the windows W11, W12 and W13. Then, the scan lines of the windows W21, W22 and W23 are selected, and the first voltage is applied to the data lines of the windows W21 and W23 while a second voltage higher than the first voltage is applied to the data line of the window 22. Finally, the scan lines of the windows W31, W32 and W33 are selected and the first voltage is equally applied to the data lines of the windows W31, W32 and W33. On the other hand, a substantially uniform voltage is applied to the common electrode for the entire screen.

The voltages of the data lines are swung periodically during the selection time of the scan lines to prevent deterioration of the liquid crystal. Consequently, a coupling capacitor is produced due to capacitive coupling between the data lines and the common electrode, and the voltage of the common electrode is distorted. Further, the higher the voltage applied to the data line, the wider the voltage swing is, and the distortion is increased accordingly.

The distortions of the voltage of the common electrode of the windows W11, W12 and W13 are substantially the same so that crosstalk is not generated since the first voltage is equally applied to the data lines of the windows W11, W12 and W13 when the scan lines of the window W11, W12 and W13 are selected. In the same manner, the crosstalk is not generated for the windows W31, W32 and W33. However, on the windows W21, W22 and W23, the distortion of the voltage of the common electrode of the window W22 is greater than the distortion of the windows W21 and W23 since the second voltage applied to the data line of the window W22 is greater than the first voltage applied to the windows W21 and W23. The greatly distorted voltage of the common electrode of the window W22 influences the voltage of the common electrodes of the windows W21 and W23, so that the gray level of the windows W21 and W23 is changed. Therefore, brighter gray than the gray originally intended to be displayed is displayed on the windows W21 and W23. This phenomenon is called "horizontal crosstalk".

When the common electrode is positioned over the entire upper substrate, a coupling capacitor between the data lines and the common electrode is easily produced and the distortion of the common electrode voltage of the window W22 easily influences the common electrode voltage of the windows W21 and W23. Therefore a horizontal crosstalk is easily produced.

A column inversion driving method has been adopted to solve the horizontal crosstalk problem. However, the column inversion driving method increases the level of voltage applied to the TFT so that power consumption is increased.

SUMMARY OF THE INVENTION

In exemplary embodiments of the present invention, a liquid crystal display in which horizontal crosstalk is suppressed, is provided.

A liquid crystal display according to an exemplary embodiment of the present invention includes a lower substrate and a plurality of data lines arranged on the lower substrate. An upper substrate positioned above the lower substrate has an opposite surface facing the lower substrate. Stripe shaped common electrodes spaced apart from each other by a plurality of regions are on the opposite surface of the upper substrate. Each said region corresponds to one of the data lines of the lower substrate.

In driving of the liquid crystal display, substantially the same voltage should be applied to the common electrodes.

The common electrodes may be formed of a transparent conductive film, which may be an ITO (indium tin oxide) film or an IZO (indium zinc oxide) film. The common electrodes may be substantially simultaneously formed using photolithography.

The liquid crystal display may further include a common electrode connection part positioned at at least one end of the common electrodes so that the common electrodes are connected to each other. The common electrodes and the common electrode connection part may be formed of a transparent conductive film, which may be an ITO (indium tin oxide) film or an IZO (indium zinc oxide) film. The common electrodes and the common electrode connection part may be substantially simultaneously formed using photolithography.

The liquid crystal display may further include red (R), green (G) and blue (B) backlights positioned below the lower substrate.

In another exemplary embodiment according to the present invention, a liquid crystal display includes a first substrate having a plurality of data lines arranged thereon, and a second substrate having a surface facing the first substrate. A gap exists between the first substrate and the second substrate. A plurality of stripe shaped common electrodes spaced apart from each other by a plurality of regions are on the surface of the second substrate facing the first substrate. Each said region corresponds to one of the data lines of the lower substrate. Liquid crystrals are disposed within the gap between the first substrate and the second substrate.

BRIEF DESCRIPTION OF THE DRAWINGS

The above and other features of the present invention will become more apparent to those of ordinary skill in the art with the following description in detail of certain exemplary embodiments thereof with reference to the attached drawings in which:

FIG. 4 is a cross sectional view taken along the cutting line I-I of FIG. 2 for illustrating a method of fabricating the liquid crystal display.

DETAILED DESCRIPTION

Figure 1:
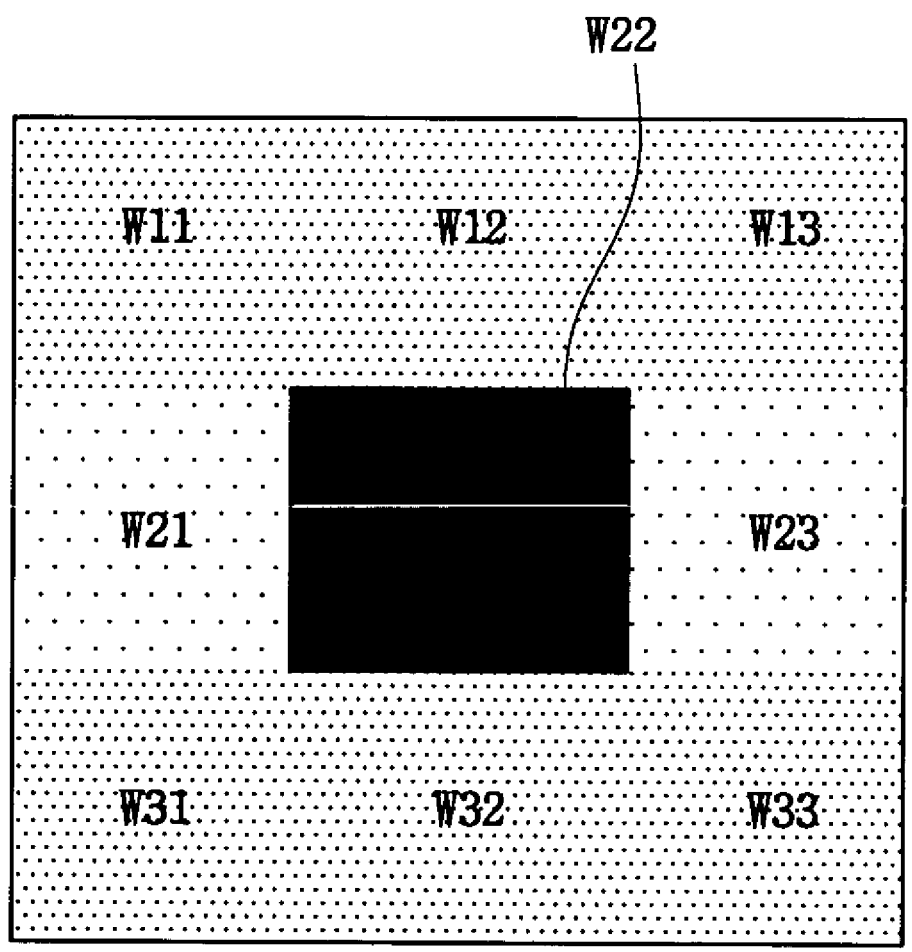
FIG. 1 is a plan view illustrating a screen of a conventional liquid crystal display on which horizontal crosstalk is generated.

The present invention will now be described in detail in connection with certain exemplary embodiments with reference to the accompanying drawings. In the drawings, like reference numerals designate like components.

Figure 2:
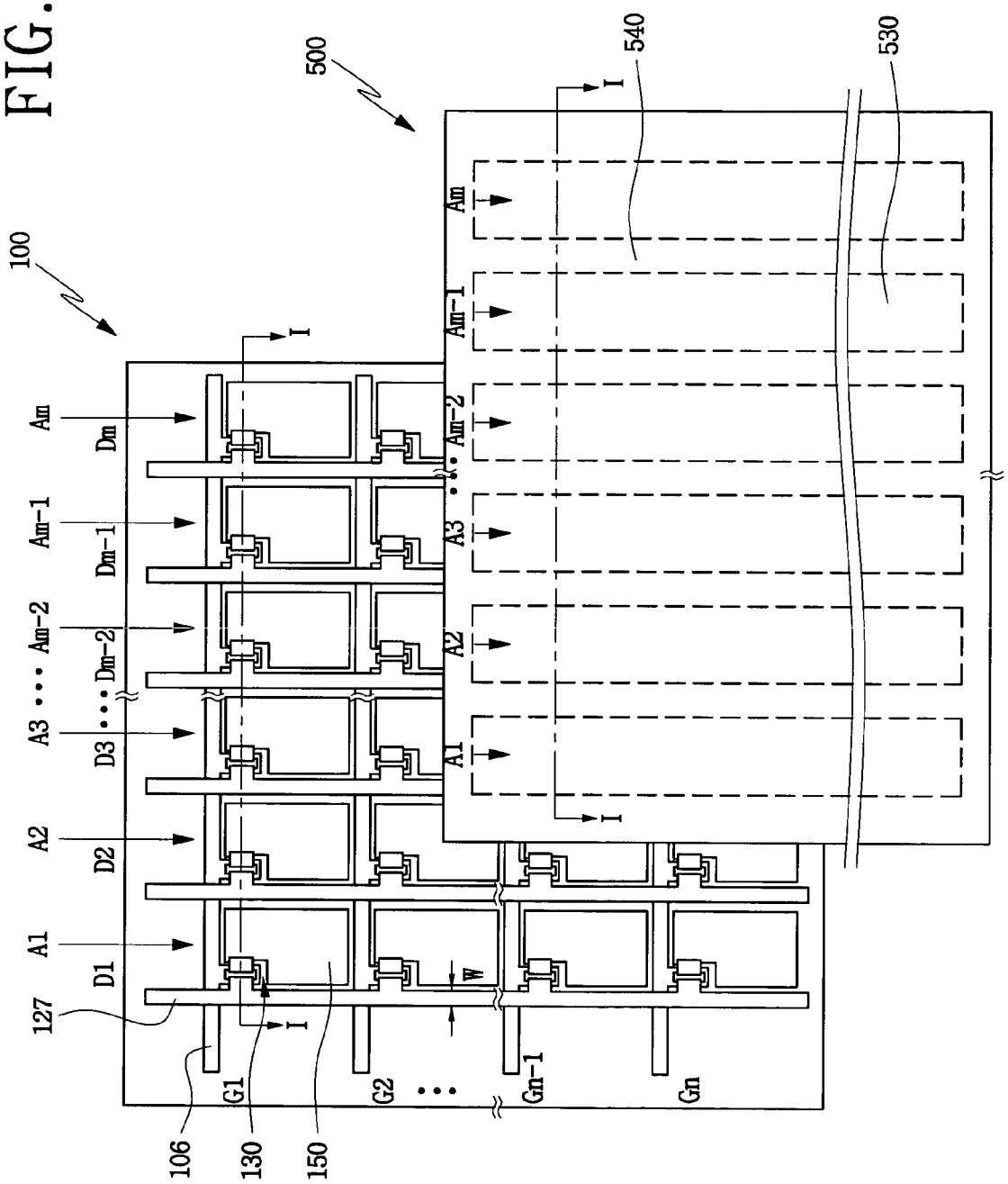
FIG. 2 is a plan view illustrating a lower substrate and an upper substrate at the same time to show a liquid crystal display according to an exemplary embodiment of the present invention.

Referring to FIG. 2, a plural (G1 to Gn) gate lines 106 extending in a first direction and a plural (D1 to Dm) data lines 127 that cross over the gate lines 106 are positioned on a lower substrate 100. Unit pixel regions are positioned in a matrix format to have columns A1 to Am and rows that are defined by intersections between the gate lines 106 and the data lines 127. A pixel electrode 150 is positioned on each unit pixel region, and a TFT 130 switched by control of a corresponding one of the gate lines 106 to transmit electrical signals applied on a corresponding one of the data lines 127 to the pixel electrode 150 is also positioned on each unit pixel region.

Further, an upper substrate 500 having an opposite surface facing the lower substrate 100 is positioned above the lower substrate 100. Stripe shaped common electrodes 530 spaced apart from each other by regions 540 are positioned on the opposite surface, wherein each region 540 is located opposite to one of the data lines 127. In other words, the common electrodes 530 are positioned over the respective columns A1 to Am of the unit pixel regions, but the common electrodes 530 are not positioned in the regions 540 corresponding to the data lines 127. Further, each region 540 has a width that is at least as large as the width W of the data lines 127. In addition, the common electrodes 530 should be formed of a transparent conductive film. By way of example, the transparent conductive film may be an ITO (indium tin oxide) film or an IZO (indium zinc oxide) film.

Liquid crystals (not shown on FIG. 2) are positioned between the lower substrate 100 and the upper substrate 500. The pixel electrode 150 on each unit pixel region, the common electrode 530 opposite to the pixel electrode 150 and liquid crystals interposed between the pixel electrodes 150 and the common electrodes 530 form a liquid crystal capacitor. The TFT 130 and the liquid crystal capacitor form one unit pixel, and the unit pixels are arranged in columns A1 to Am and rows to form a pixel array.

In driving the foregoing liquid crystal display, a specific unit pixel is selected by applying voltage to the selected gate line and data line. The TFT 130, which is turned on according to the voltage applied to the gate line 106, transfers the voltage applied to the data line 127 to the pixel electrode 150 so that the voltage is applied to the pixel electrode 150. On the other hand, a common voltage is applied to the common electrode 530 opposite to the pixel electrode 150. At this time, arrangement of liquid crystals positioned between the pixel electrode 150 and the common electrode 530 varies in accordance with the voltage difference between the pixel electrode 150 and the common electrode 530, so that transmittance of light is controlled. Therefore, gray level is realized in the unit pixels.

Substantially the same voltage is applied to all of the common electrodes 530 positioned on the upper substrate 500. However, production of the coupling capacitor due to capacitive coupling induced between the common electrodes 530 and the selected data lines 127 is suppressed (i.e., reduced or eliminated), since the common electrodes 530 are not positioned on the regions corresponding to the data lines 127. Therefore, distortion of the common electrode voltage is suppressed. Consequently, horizontal crosstalk due to distortion of the common electrode voltage is suppressed. Further, even if a distortion of the common electrode voltage of an unit pixel were produced, the distortion would not influence other unit pixels positioned left or right of the unit pixel because the common electrodes 530 are spaced apart from each other by the regions 540 located therebetween. Consequently, horizontal crosstalk is further suppressed.

By way of example, application of substantially the same voltage to the common electrodes 530 can be performed through wirings respectively connected to the common electrodes 530 from a common voltage applying circuit (not shown in FIG. 2).

Figure 3:
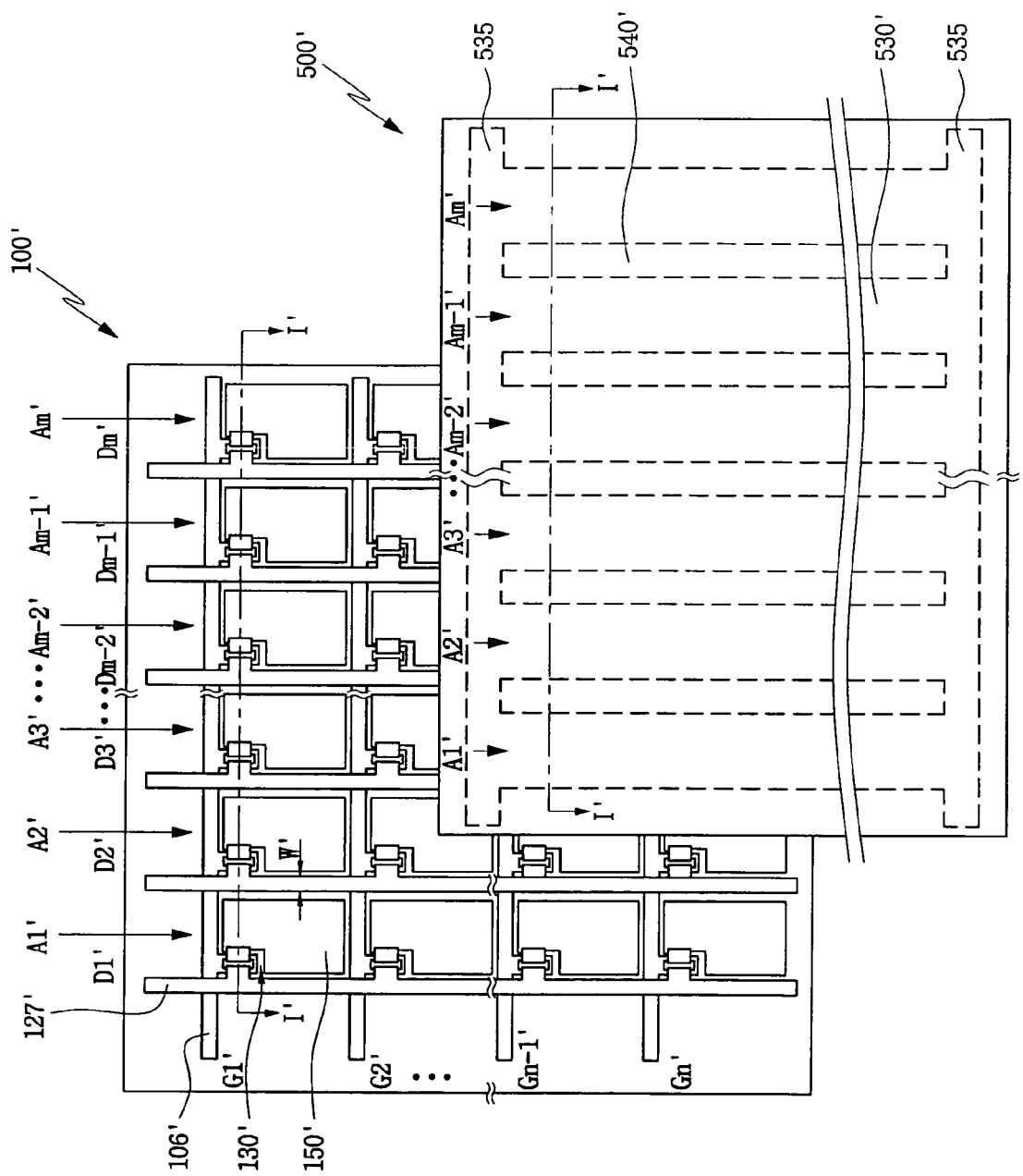
FIG. 3 is a plan view illustrating a lower substrate and an upper substrate at the same time to show a liquid crystal display according to another exemplary embodiment of the present invention.

FIG. 3 is a plan view illustrating a lower substrate and an upper substrate at the same time to show a liquid crystal display according to another exemplary embodiment of the present invention. A liquid crystal display in FIG. 3 has a different structure of common electrodes compared with the liquid crystal display of FIG. 2. By comparing FIGS. 2 and 3, it can be seen that the liquid crystal display of FIG. 3 is substantially the same as the liquid crystal display of FIG. 2 except as follows.

Referring to FIG. 3, matrix shaped unit pixel regions are defined by a plural (G1' to Gn') gate lines 106' and a plural (D1' to Dm') data lines 127' positioned on a lower substrate 100'. A pixel electrode 150' and a TFT 130' are positioned on each unit pixel region.

An upper substrate 500' having an opposite surface facing the lower substrate 100' is positioned above the lower substrate 100'. Stripe shaped common electrodes 530' spaced apart from each other by regions 540' located therebetween are positioned on the opposite surface of the upper substrate 500', wherein the regions 540' are located opposite to the data lines 127'. In other words, the common electrodes 530' are positioned corresponding to the respective columns A1' to Am' of the unit pixel regions, but the common electrodes 530' are not positioned in the regions 540' corresponding to the data lines 127'. Further, each region 540' may have a width that is at least as large as the width W' of the data lines 127'.

Common electrode connection parts 535 are positioned at one or both ends of the common electrodes 530' so that the common electrodes 530' arranged on the opposite surface of the upper substrate 500' are connected to each other. The common electrode connection parts 535 and the common electrodes 530' are formed of a transparent conductive film. By way of example, the transparent conductive film may be an ITO (indium tin oxide) film or an IZO (indium zinc oxide) film.

In driving the foregoing liquid crystal display, substantially the same voltage is applied to the common electrodes 530', wherein applying substantially the same voltage to the common electrodes 530 can be performed through wirings connected to the common electrode connection parts 535 from a common voltage applying circuit (not shown on FIG. 3).

FIG. 4 is a cross sectional view taken along the cutting line I-I of FIG. 2 for illustrating a method of fabricating the liquid crystal display according to exemplary embodiments of the present invention. It should be noted that the cross sectional view taken along the cutting line I'-I' of FIG. 3 is substantially the same as the cross sectional view of FIG. 4.

Referring to FIG. 4, a gate electrode 105 is formed in each unit pixel region of a lower substrate 100 having A1 to Am unit pixel regions, and a gate insulating film 110 is formed on the gate electrode 105. A semiconductor layer 120 corresponding to the gate electrode 105 is formed on the gate insulating film 110. Source/drain electrodes 125, 126 are formed on both edges of the semiconductor layer 120. At the same time, a data line 127 connected to the source/drain electrode 126 is formed. With this, a TFT 130 having the gate electrode 105, the semiconductor layer 120 and the source/drain electrodes 125, 126 is formed in each unit pixel region. Subsequently, a protection film 160 having contact holes for exposing a certain region of the source/drain electrode 125 is formed on the TFT 130, and a pixel electrode 150 contacted with the source/drain electrode 125 through the contact holes is formed on the protection film 160. Next, a lower alignment film 170 is formed on the pixel electrode 150.

An upper substrate 500 is also prepared, and a shielding film 510 is formed on the upper substrate 500. The shielding film 510 corresponds to a region on which the TFT 130, the data lines 127 and the gate lines (106 of FIG. 2) are formed. An insulating film 520 is formed on the shielding film 510. Subsequently, a transparent electrode film is deposited over the entire insulating film 520. The transparent electrode film may, for example, be an ITO film or an IZO film. Stripe shaped common electrodes 530 spaced apart from each other by a region 540 are formed by patterning the deposited transparent electrode film using photolithography process. The regions 540 correspond to data lines 127. Further, the region 540 may be wider than the width W of the data lines. Subsequently, an upper alignment film 550 is formed on the common electrodes 530.

The liquid crystal display of FIG. 3 is fabricated using substantially the same method as the liquid crystal display of FIG. 2 as described in reference to FIG. 4. In addition, when patterning the transparent electrode film deposited on the upper substrate 500' using the photolithography process, the common electrodes 530' and the common electrode connection parts 535 should be simultaneously formed. Referring back to FIG. 4, the lower substrate 100 and the upper substrate 500 are laminated in such a way that a certain gap is maintained between the lower substrate 100 and the upper substrate 500. Then, liquid crystals 600 are injected into the gap between the lower substrate 100 and upper substrate 500. Substantially the same steps are also taken to fabricate the liquid crystal display of FIG. 3.

As shown in FIG. 4, the liquid crystal display has R, G and B backlights 700 that are arranged per each of the unit pixel below the lower substrate 100 to display color images. This liquid crystal display is referred to as a field sequential driving type liquid crystal display (herein after referred to as "FS LCD"). The FS LCD displays color images using afterimage by time-sharingly sequential displaying three primary lights of R, G and B from the R, G and B backlights through liquid crystals. In other embodiments, the liquid crystal display may further include R, G and B color filter layers (not shown in FIG. 4) formed between the shielding film 510 and the insulating film 520 to realize color images.

As described above, a liquid crystal display according to the exemplary embodiments of the present invention is capable of suppressing (reducing or eliminating) production of coupling capacitor according to capacitive coupling between the data lines and common electrodes and relieving distortion of common electrode voltage accordingly by forming the common electrodes in such a way that the common electrodes are not positioned in regions corresponding to the data lines. Consequently, the liquid crystal display according to exemplary embodiments of the present invention is capable of suppressing horizontal crosstalk.

While the present invention has been shown and described with reference to certain exemplary embodiments thereof, it will be understood by those skilled in the art that the foregoing and other changes in form and details may be made therein without departing from the spirit or scope of the present invention as embodied in the appended claims and equivalents thereof.

What is claimed is:

1. A liquid crystal display comprising:
    a lower substrate;
    a plurality of data lines and a plurality of pixel electrodes on the lower substrate;
    an upper substrate positioned above the lower substrate and having a surface facing the lower substrate;
    stripe shaped common electrodes spaced apart from each other by a plurality of regions on the surface of the upper substrate, wherein the stripe shaped common electrodes substantially overlap with the pixel electrodes, and wherein each said region corresponds to one of the data lines of the lower substrate;
    a shielding film between the surface of the upper substrate and the stripe shaped common electrodes, wherein portions of the shielding film overlap with the plurality of data lines at the plurality of regions and other portions of the shielding film overlap with portions of the stripe shaped common electrodes;
    liquid crystals disposed between the upper and lower substrates, wherein the pixel electrodes, the stripe shaped common electrodes, and the liquid crystals form a plurality of liquid crystal capacitors;
    a lower alignment film disposed on the pixel electrodes; and
    an upper alignment film disposed on the stripe shaped common electrodes and the plurality of regions.

2. The liquid crystal display according to claim 1, wherein substantially the same voltage is applied to the common electrodes.

3. The liquid crystal display according to claim 1, wherein the common electrodes are formed of a transparent conductive film.

4. The liquid crystal display according to claim 3, wherein the transparent conductive film is an ITO (indium tin oxide) film or an IZO (indium zinc oxide) film.

5. The liquid crystal display according to claim 1, wherein the common electrodes are substantially simultaneously formed using photolithography.

6. The liquid crystal display according to claim 1, further comprising a common electrode connection part positioned at at least one end of the common electrodes so that the common electrodes are connected to each other.

7. The liquid crystal display according to claim 6, wherein the common electrodes and the common electrode connection part are formed of a transparent conductive film.

8. The liquid crystal display according to claim 7, wherein the transparent conductive film is an ITO film or an IZO film.

9. The liquid crystal display according to claim 6, wherein the common electrodes and the common electrode connection part are substantially simultaneously formed using photolithography.

10. The liquid crystal display according to claim 1, further comprising red (R), green (G) and blue (B) backlights positioned below the lower substrate.

11. A liquid crystal display comprising:
a lower substrate;
a plurality of data lines and a plurality of pixel electrodes on the lower substrate;
an upper substrate positioned above the lower substrate and having a surface facing the lower substrate;
stripe shaped common electrodes spaced apart from each other by a plurality of regions on the surface of the upper substrate, wherein the stripe shaped common electrodes substantially overlap with the pixel electrodes, and wherein each said region corresponds to one of the data lines of the lower substrate;
a common electrode connection part positioned at at least one end of the common electrodes so that the common electrodes are connected to each other;
a shielding film between the surface of the upper substrate and the stripe shaped common electrodes, wherein portions of the shielding film overlap with the plurality of data lines at the plurality of regions and other portions of the shielding film overlap with portions of the stripe shaped common electrodes;
liquid crystals disposed between the upper and lower substrates, wherein the pixel electrodes, the striped shaped common electrodes, and the liquid crystals form a plurality of liquid crystal capacitors;
a lower alignment film disposed on the pixel electrodes; and
an upper alignment film disposed on the stripe shaped common electrodes and the plurality of regions.

12. The liquid crystal display according to claim 11, wherein substantially the same voltage is applied to the common electrodes.

13. The liquid crystal display according to claim 11, wherein the common electrodes are formed of a transparent conductive film.

14. The liquid crystal display according to claim 13, wherein the transparent conductive film is an ITO (indium tin oxide) film or an IZO (indium zinc oxide) film.

15. The liquid crystal display according to claim 11, wherein the common electrodes and the common electrode connection part are formed of a transparent conductive film.

16. The liquid crystal display according to claim 11, wherein the common electrodes and the common electrode connection part are substantially simultaneously formed using photolithography.

17. The liquid crystal display according to claim 11, further comprising red (R), green (G) and blue (B) backlights positioned below the lower substrate.

18. A liquid crystal display comprising:
a first substrate having a plurality of data lines and a plurality of pixel electrodes thereon;
a second substrate having a surface facing the first substrate, wherein a gap exists between the first substrate and the second substrate;
a plurality of stripe shaped common electrodes spaced apart from each other by a plurality of regions on the surface of the second substrate facing the first substrate, wherein the stripe shaped common electrodes substantially overlap with the pixel electrodes, and wherein each said region corresponds to one of the data lines of the lower substrate;
a shielding film between the surface of the second substrate and the stripe shaped common electrodes, wherein portions of the shielding film overlap with the plurality of data lines at the plurality of regions and other portions of the shielding film overlap with portions of the stripe shaped common electrodes;
liquid crystals disposed within the gap between the first substrate and the second substrate, wherein the pixel electrodes, the stripe shaped common electrodes, and the liquid crystals form a plurality of liquid crystal capacitors;
a first alignment film disposed on the pixel electrodes; and
a second alignment film disposed on the stripe shaped common electrodes and the plurality of regions.

19. The liquid crystal display of claim 18, wherein each said region is at least as wide as the corresponding one of the data lines.

20. The liquid crystal display of claim 18, further comprising a common electrode connection part positioned at at least one end of the common electrodes so that the common electrodes are connected to each other.

* * * * *